(12) United States Patent
Kim

(10) Patent No.: US 11,820,374 B2
(45) Date of Patent: Nov. 21, 2023

(54) CONTROL DEVICE FOR RESPONDING TO FAILURE OF BRAKE SYSTEM OF FOUR-WHEEL DRIVE ELECTRIC VEHICLE

(71) Applicants: Hyundai Motor Company, Seoul (KR); Kia Motors Corporation, Seoul (KR)

(72) Inventor: Gwi Chul Kim, Anyang-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 398 days.

(21) Appl. No.: 17/117,040

(22) Filed: Dec. 9, 2020

(65) Prior Publication Data
US 2022/0017092 A1 Jan. 20, 2022

(30) Foreign Application Priority Data
Jul. 20, 2020 (KR) .................. 10-2020-0089561

(51) Int. Cl.
*B60W 30/18* (2012.01)
*B60L 7/10* (2006.01)
(Continued)

(52) U.S. Cl.
CPC ......... *B60W 30/18109* (2013.01); *B60L 7/10* (2013.01); *B60L 7/26* (2013.01); *B60L 15/38* (2013.01); *B60T 8/175* (2013.01); *B60T 8/92* (2013.01); *B60T 17/221* (2013.01); *B60W 10/02* (2013.01); *B60W 10/08* (2013.01);
(Continued)

(58) Field of Classification Search
CPC ........... B60W 30/18109; B60W 10/02; B60W 10/08; B60W 10/188; B60W 10/192; B60W 2510/083; B60W 2510/18; B60W 2510/182; B60W 2520/10; B60W 2710/021; B60W 2710/083; B60W 2710/18; B60W 2710/182; B60W 30/18127; B60W 40/105; B60W 50/0205; B60W 2050/021; B60W 2300/18; B60W 2520/26; B60L 7/10; B60L 7/26; B60L 15/38; B60L 2240/12; B60L 2240/423; B60L 2240/465; B60L 2240/50; B60L 2270/00; B60L 2250/26; B60L 2260/24; B60L 2260/28; B60T 8/175; B60T 8/92; B60T 17/221; B60T 2240/00; B60T 2250/04; B60T 2270/202; B60T 2270/603; B60T 2270/604; B60T 2270/88; B60T 17/22; B60K 23/08; B60Y 2300/18066; B60Y 2306/15; B60Y 2400/81; B60Y 2400/82
See application file for complete search history.

(56) References Cited
U.S. PATENT DOCUMENTS 10,576,955 B2 * 3/2020 Yun ............................ B60T 8/92
2007/0193808 A1 * 8/2007 Perakes ................. B60W 20/10
180/65.265
(Continued)

*Primary Examiner* — James M McPherson
*Assistant Examiner* — Kyle J Kingsland
(74) *Attorney, Agent, or Firm* — MORGAN, LEWIS & BOCKIUS LLP

(57) ABSTRACT

A control device may be configured for responding to failure for ensuring the stability of a vehicle by switching from a two-wheel-drive mode to a four-wheel-drive mode when detecting failure of the brake system in a two-wheel-drive mode.

16 Claims, 11 Drawing Sheets

(51) Int. Cl.

| | | |
|---|---|---|
| *B60W 10/08* | (2006.01) | |
| *B60W 10/192* | (2012.01) | |
| *B60W 10/188* | (2012.01) | |
| *B60L 7/26* | (2006.01) | |
| *B60T 17/22* | (2006.01) | |
| *B60W 10/02* | (2006.01) | |
| *B60T 8/92* | (2006.01) | |
| *B60T 8/175* | (2006.01) | |
| *B60L 15/38* | (2006.01) | |

(52) U.S. Cl.
CPC ........ *B60W 10/188* (2013.01); *B60W 10/192* (2013.01); *B60L 2240/12* (2013.01); *B60L 2240/423* (2013.01); *B60L 2240/465* (2013.01); *B60L 2240/50* (2013.01); *B60L 2270/00* (2013.01); *B60T 2240/00* (2013.01); *B60T 2250/04* (2013.01); *B60T 2270/202* (2013.01); *B60T 2270/603* (2013.01); *B60T 2270/604* (2013.01); *B60T 2270/88* (2013.01); *B60W 2510/083* (2013.01); *B60W 2510/18* (2013.01); *B60W 2510/182* (2013.01); *B60W 2520/10* (2013.01); *B60W 2710/021* (2013.01); *B60W 2710/083* (2013.01); *B60W 2710/18* (2013.01); *B60W 2710/182* (2013.01)

(56) References Cited

U.S. PATENT DOCUMENTS

| | | | |
|---|---|---|---|
| 2011/0172863 A1* | 7/2011 | Yu | G16Z 99/00 |
| | | | 180/65.285 |
| 2015/0060173 A1* | 3/2015 | Okubo | B60W 20/10 |
| | | | 903/902 |
| 2016/0082973 A1* | 3/2016 | Richards | B60W 30/18172 |
| | | | 701/41 |
| 2017/0166053 A1* | 6/2017 | Ogawa | B60W 40/114 |
| 2020/0094674 A1* | 3/2020 | Tamura | B60K 17/35 |

* cited by examiner

CONTROL DEVICE FOR RESPONDING TO FAILURE OF BRAKE SYSTEM OF FOUR-WHEEL DRIVE ELECTRIC VEHICLE

CROSS-REFERENCE TO RELATED APPLICATION

The present application claims priority to Korean Patent Application No. 10-2020-0089561 filed on Jul. 20, 2020, the entire contents of which is incorporated herein for all purposes by this reference.

BACKGROUND OF THE INVENTION

Field of the Invention

The present invention relates to a control device configured for responding to failure of a brake system of a four-wheel-drive electric vehicle, and more particularly to a control device configured for responding to failure for ensuring the stability of a vehicle when a brake system malfunctions in a two-wheel-drive mode.

Description of Related Art

In the case of a four-wheel drive electric vehicle in which independent motors are applied to front and rear wheels, counter driving force is transferred to a reducer of an auxiliary driving wheel, causing drag loss while the vehicle travels in a two-wheel-drive mode, and to prevent this, a power switch device referred to as a disconnector is used.

In a four-wheel-drive electric vehicle that adopts the rear wheels as the main driving wheels and the front wheels as auxiliary driving wheels, a disconnector is provided at a driveshaft of the front wheel.

When a vehicle travels in a two-wheel-drive mode in which power is not required to be transferred to the auxiliary driving wheel, the disconnector releases a connection between an auxiliary driving motor and the auxiliary driving wheel, and when the vehicle travels in a four-wheel-drive mode in which power is required to be transferred to the auxiliary driving wheel, the disconnector connects the auxiliary driving motor and the auxiliary driving wheel.

However, with regard to the four-wheel-drive electric vehicle, technology for responding to failure of a brake system has not been established, and failure of the brake system causes unpredictable loss or shortage of braking force, and thus the behavior of a vehicle becomes unstable.

Accordingly, there is a demand for technology for ensuring the stability of a vehicle when a brake system malfunctions, more particularly, technology for ensuring the stability of a vehicle when the brake system malfunctions in a coasting situation as well as in acceleration and braking situations.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a control device configured for responding to failure of a brake system of a four-wheel-drive electric vehicle for ensuring the stability of a vehicle by switching a two-wheel-drive mode to a four-wheel-drive mode when failure of the brake system is detected in the two-wheel-drive mode.

In various exemplary embodiments of the present invention, a control device configured for responding to failure of a brake system of a four-wheel-drive electric vehicle includes a first motor configured to selectively provide a driving torque to a main driving wheel, a second motor configured to selectively provide a driving torque of an auxiliary driving wheel, a disconnector provided at a driveshaft of the auxiliary driving wheel and configured to selectively switch a power transfer between the auxiliary driving wheel and the second motor, and a controller configured to engage the disconnector and to connect the auxiliary driving wheel and the second motor upon detecting the failure of the brake system in the vehicle when the vehicle travels in a state in which the auxiliary driving wheel and the second motor are disconnected by the disconnector.

The control device configured for responding to failure according to various exemplary embodiments of the present invention may have the following detailed features.

First, upon detecting a first braking failure of the brake system while the vehicle is accelerating, the controller may redistribute an acceleration torque requested by a driver to the first motor and the second motor when the disconnector is engaged. In the instant case, the first braking failure may be failure in which it is not possible to normally provide target hydraulic pressure through manipulation of a brake pedal of the vehicle. When the disconnector is engaged, the auxiliary driving wheel and the second motor may be connected to transfer power.

When a spin ratio of the main driving wheel and the auxiliary driving wheel is greater than a predetermined first spin ratio, the controller may reduce driving torque of the first motor and the second motor and may reduce the spin ratio of the main driving wheel and the auxiliary driving wheel.

Second, when detecting a second braking failure of the brake system when the vehicle is accelerating, the controller may limit a maximum vehicle speed to a predetermined first speed, and may redistribute an acceleration torque requested by a driver to the first motor and the second motor when the disconnector is engaged. In the instant case, the second braking failure may be failure in which an additional braking function system cannot be operated for preventing spinning and slippage of a driving wheel Third, upon detecting a first braking failure of the brake system while the vehicle is coasting, the controller may redistribute coasting torque, depending on a vehicle speed, to the first motor and the second motor when the disconnector is engaged.

When a slip ratio of the main driving wheel and the auxiliary driving wheel is equal to or greater than a predetermined first slip ratio, the controller may be configured to control coasting torque of the first motor and the second motor and may reduce the slip ratio of the main driving wheel and the auxiliary driving wheel.

Fourth, when detecting a second braking failure of the brake system when the vehicle is coasting, the controller may limit a maximum vehicle speed to a predetermined first speed and may perform cancel release on generation of coasting torque of the first motor and the second motor when the disconnector is engaged.

Fifth, when detecting the first braking failure of the brake system while the vehicle is braking, the controller may redistribute coasting torque depending on a vehicle speed and a regenerative braking torque through manipulation of a brake pedal to the first motor and the second motor when the disconnector is engaged.

When the slip ratio of the main driving wheel and the slip ratio of the auxiliary driving wheel are equal to or greater than a predetermined first slip ratio and is less than a second slip ratio, the controller may perform cancel release on generation of regenerative braking torque of the first motor and the second motor and may control the coasting torque of the first motor and the second motor to reduce the slip ratio of the main driving wheel and the auxiliary driving wheel.

When the slip ratio of the main driving wheel and the slip ratio of the auxiliary driving wheel are equal to or greater than the second slip ratio, the controller may perform cancel release on generation of the coasting torque and the regenerative braking torque of the first motor and the second motor to supply braking hydraulic pressure to a wheel brake of each of the main driving wheel and the auxiliary driving wheel. In the instant case, the braking hydraulic pressure of the wheel brake may be determined based on the coasting torque and the regenerative braking torque. The controller may be configured to control braking pressure of the wheel brake to reduce the slip ratio of the main driving wheel and the auxiliary driving wheel.

Sixth, when detecting the second braking failure of the brake system while the vehicle is braking, the controller may perform cancel release on generation of the coasting torque and the regenerative braking torque of the first motor and the second motor.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
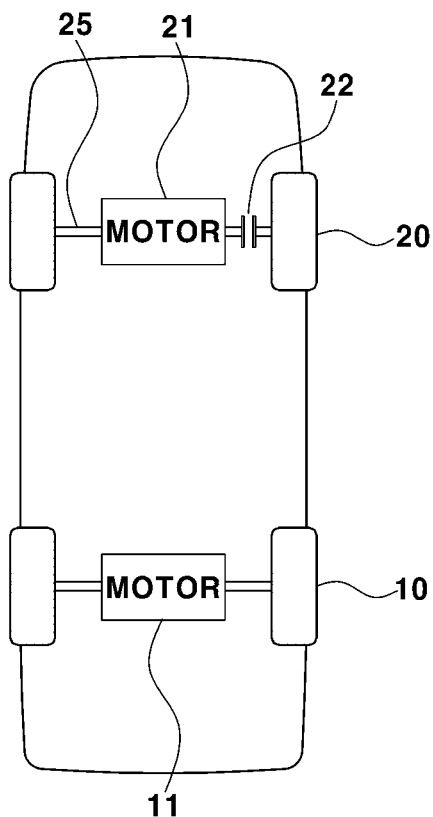
FIG. 1 is a diagram showing some components of a four-wheel-drive electric vehicle to which a control device configured for responding to failure is applied according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter reference will now be made in detail to various embodiments of the present invention, examples of which are illustrated in the accompanying drawings and described below. Features shown in the accompanying drawings are illustrated for easily describing various exemplary embodiments of the present invention and may be different from the actual form.

In the specification, when a certain part is said to "include" a certain component, this indicates that the part may further include another component, rather than necessarily excluding the other component, unless there is a disclosure to the contrary.

The present invention relates to a control device configured for responding to failure of a brake system of a four-wheel-drive electric vehicle, and to a control device configured for responding to failure of a brake system of a vehicle including independent drivers for driving a front wheel and a rear wheel, and a disconnector, provided at a driveshaft and for switching power transfer by the driver.

Figure 2:
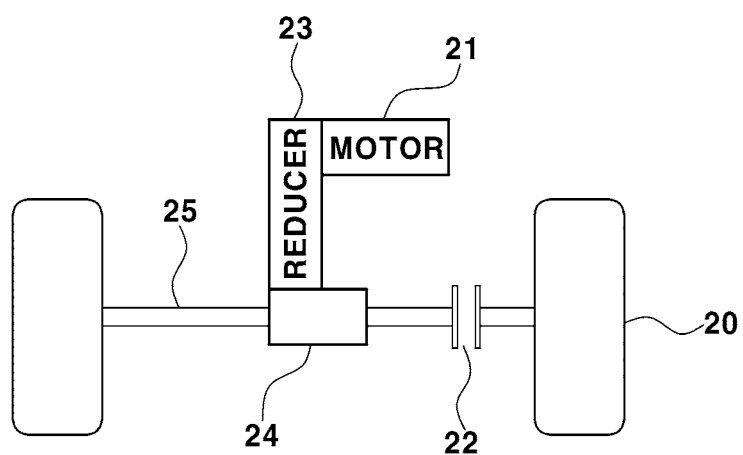
FIG. 2 is a diagram showing a driveshaft for switching power transfer through a disconnector of the four-wheel-drive electric vehicle.

FIG. 1 is a diagram showing some components of a four-wheel-drive electric vehicle to which a control device is applied according to various exemplary embodiments of the present invention. FIG. 2 is a diagram showing a driveshaft for switching power transfer through a disconnector of the four-wheel-drive electric vehicle.

As shown in FIG. 1, independent motors 11 and 21 for driving a main driving wheel 10 and an auxiliary driving wheel 20 may be provided in the four-wheel-drive electric vehicle. In detail, a first motor 11 for driving the main driving wheel 10 and a second motor 21 for driving the auxiliary driving wheel 20 may be independently provided in the four-wheel-drive electric vehicle.

The four-wheel-drive electric vehicle may travel in any one of a four-wheel-drive (4WD) mode and a two-wheel-drive (2WD) mode. In the four-wheel-drive mode, a vehicle may travel using the driving force of the first motor 11 and the second motor 21, and in the two-wheel-drive mode, the vehicle may travel using the driving force of the first motor 11 for driving the main driving wheel 10.

A driving motor and driving wheels that are used in a two-wheel-drive mode may be predetermined. In the two-wheel-drive mode, the driving wheels that receive driving force may be the main driving wheels 10, and in the two-wheel-drive mode, a driving motor configured for supplying driving force may be referred to as a main driving motor. Here, it is noted that the main driving motor is the first motor 11.

The driving wheels that are not used in the two-wheel-drive mode may be the auxiliary driving wheels 20. When the vehicle travels without supplying separate power to the auxiliary driving wheels 20, that is, when the vehicle travels in the two-wheel-drive mode, drag loss may occur while counter driving force is transferred to the reducer 23 (refer to FIG. 2) of an auxiliary driving motor (i.e., the second motor) from the auxiliary driving wheel 20.

Accordingly, to block the counter driving force transferred from the auxiliary driving wheel 20 in the two-wheel-drive mode, a disconnector 22 may be provided at a driveshaft 25 of the auxiliary driving wheels 20. For example, in a four-wheel-drive electric vehicle that adopts the rear wheels as the main driving wheels and the front wheels as auxiliary driving wheels, a disconnector may be provided at a driveshaft of the front wheels.

When a vehicle travels in a two-wheel-drive mode in which power is not required to be transferred to the auxiliary driving wheels 20, the disconnector 22 may release the connection between the second motor 21 and the auxiliary driving wheels 20, and when the vehicle travels in a four-wheel-drive mode in which power is required to be transferred to the auxiliary driving wheels 20, the disconnector 22 may connect the second motor 21 and the auxiliary driving wheels 20.

In other words, the disconnector 22 may connect the auxiliary driving wheel 20 and the second motor 21 to transfer the power of the second motor 21 to the auxiliary driving wheels 20 in the four-wheel-drive mode, and may disconnect the auxiliary driving wheels 20 and the second motor 21 from each other to block the transfer of power of the second motor 21 to the auxiliary driving wheels 20 in the two-wheel-drive mode.

Thus, the four-wheel-drive electric vehicle may perform connection or disconnection on the disconnector 22, and thus may switch power transfer between the second motor 21 and the auxiliary driving wheels 20 through the driveshaft 25.

Referring to FIG. 2, the disconnector 22 may be provided at the driveshaft 25 between the auxiliary driving wheel 20 and a differential 24. In a four-wheel-drive electric vehicle that adopts the rear wheels as the auxiliary driving wheels and the front wheels as the main driving wheels, the disconnector may be provided at the driveshaft of the rear wheels.

A hydraulic brake system for operating a wheel brake using hydraulic pressure and an additional braking function system for preventing undesirable behavior such as spinout of a vehicle may be provided in the four-wheel-drive electric vehicle.

The additional braking function system may use an anti-lock brake system (ABS), a traction control system (TCS), roll stability control (RSC), electronic stability control (ESC), and the like.

The ABS may be a system for preventing locking of a driving wheel when a slip ratio of the driving wheel is increased when a vehicle suddenly brakes. The ABS may prevent a driving wheel from being locked by controlling the braking pressure of a wheel brake provided on the driving wheel.

The TCS may be a system for preventing wheel spin and ensuring the acceleration characteristics of a vehicle by controlling the driving torque of a motor when a driving wheel spins while the vehicle accelerates. The TCS may perform control to reduce the driving torque of a motor to prevent excessive driving torque in the motor while a vehicle accelerates on a low-friction road surface on which the vehicle easily slips. In the instant case, the motor may be operated to provide the requested torque according to a command of a brake controller. When excessive driving torque is generated by the motor, spinning of a driving wheel may occur.

The RSC may be a system for preventing wheel slip and ensuring the stability of a vehicle by controlling the motor torque while the vehicle decelerates. The RSC may prevent slippage of a driving wheel by reducing the coasting torque of a motor based on a slip ratio of the driving wheel. In the instant case, the RSC may be operated to provide the requested torque according to a command of a brake controller.

The ESC may be a system for stably maintaining the position of a vehicle according to signals of various sensors provided in a vehicle in an emergency situation while the vehicle travels.

These additional braking function systems may ensure the stability of the behavior of a vehicle by preventing spin, slip, or locking of a driving wheel and may be included in a brake system of the vehicle in a broad sense.

Here, the brake system of the vehicle may include the hydraulic brake system and the additional braking function system.

When the hydraulic brake system malfunctions, a problem may occur, and for example, it is not possible to normally provide the target hydraulic pressure according to a command of a brake controller in a vehicle. Thus, when provision of hydraulic pressure and the responsiveness of the hydraulic brake system are interrupted, unpredictable loss or shortage of braking force may occur, and thus the behavior of a vehicle becomes unstable.

For example, when a problem of oil leakage occurs in a hydraulic pressure line, the hydraulic brake system is not configured for normally providing the target hydraulic pressure (requested hydraulic pressure) through operation of a brake pedal.

When the additional braking function system malfunctions, the additional braking function system is not configured for being operated, and thus it may not be possible to prevent spinning or slippage of the driving wheel, and the stability of a vehicle may be degraded and the behavior of the vehicle may become unstable while the vehicle travels. When the additional braking function system malfunctions, it may not be possible to operate the additional braking function system, but it may be possible to operate the hydraulic brake system.

Here, failure of the hydraulic brake system and failure of the additional braking function system may be interpreted as failure of the entire vehicle brake system.

The present invention is provided to ensure the stability of a vehicle when the aforementioned failure of the brake system is detected, in detail, to ensure the stability of the vehicle while coasting as well as while accelerating and braking.

A four-wheel-drive electric vehicle may be advantageous compared to a two-wheel drive vehicle in ensuring the stability of a vehicle in a four-wheel-drive mode, and thus, when failure of the brake system is detected in a two-wheel-drive mode, the disconnector may be engaged to thereby switch from the two-wheel-drive mode to the four-wheel-drive mode.

Failure of the hydraulic brake system and the additional braking function system may be detected by a brake controller 31. The brake controller 31 may control the operation of the hydraulic brake system and may detect failure, and simultaneously may also detect failure of the additional braking function system.

Figure 3:
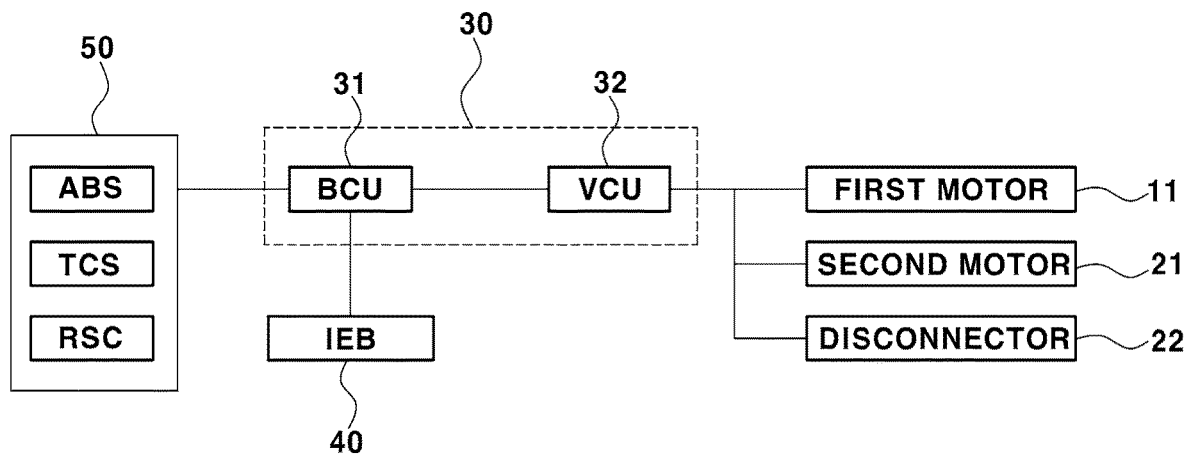
FIG. 3 is a diagram showing the configuration of a control device configured for responding to failure according to various exemplary embodiments of the present invention.

Referring to FIG. 3, when detecting the failure of a hydraulic brake system 40, the brake controller 31 may transmit a first brake failure signal to a vehicle control unit (VCU) 32, and when detecting failure of an additional braking function system 50, the brake controller 31 may transmit a second brake failure signal to the VCU 32.

Here, the first brake failure signal may refer to braking failure whereby it is possible to operate the hydraulic brake system 40 but a wheel brake is not configured for normally providing the target hydraulic pressure based on a command of the brake controller 31, input through manipulation of a brake pedal of the vehicle. The second brake failure signal may refer to braking failure whereby it is possible to operate the hydraulic brake system 40 but it is not possible to operate the additional braking function system 50.

The VCU 32 may control the driving source of the four-wheel-drive electric vehicle, and simultaneously may control the operation of the power switch device. That is, the VCU 32 may control the operation of the first motor 11 and the second motor 21 and may also control the operation of the disconnector 22.

The control device configured for responding to failure of a brake system according to various exemplary embodiments of the present invention may be operated to ensure the stability of a vehicle through cooperative control of controllers provided in the vehicle, such as the brake controller 31 and the VCU 32.

Accordingly, as seen from FIG. 3, a controller 30 of the control device configured for responding to failure may include the brake controller 31 and the VCU 32.

When detecting failure of the brake systems 40 and 50 while the vehicle travels in the state in which the auxiliary driving wheel 20 and the second motor 21 are disconnected by the disconnector 22 (i.e., a two-wheel-drive mode), the controller 30 may engage the disconnector 22 and may switch the driving mode of the vehicle to four-wheel drive.

Hereinafter, a method of responding to failure of a brake system for each driving mode will be described with reference to FIGS. 4 to 11.

Figure 4:
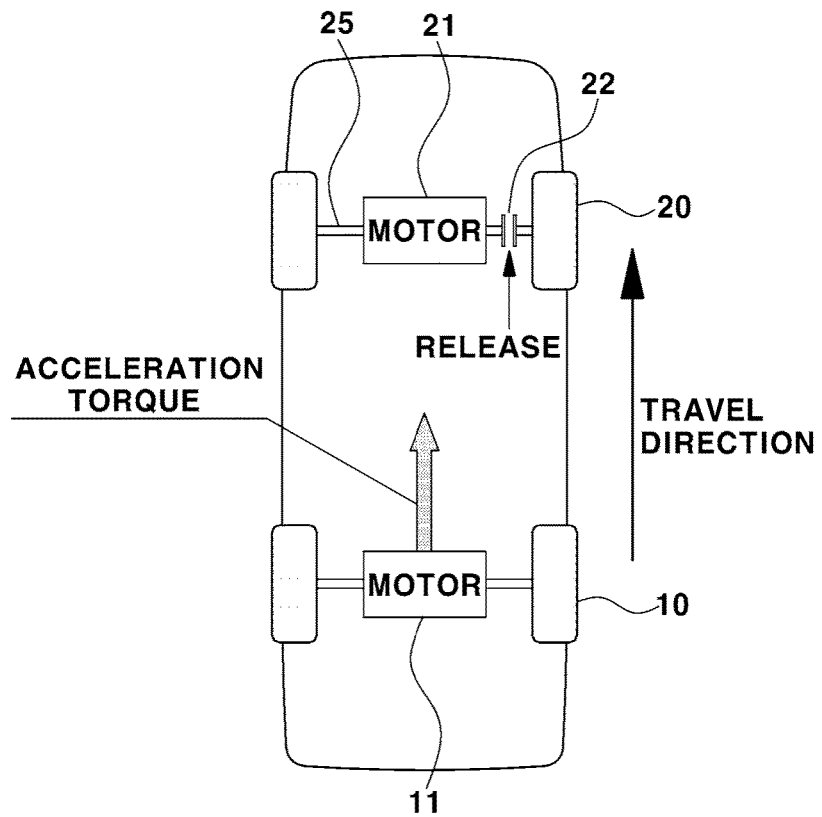
FIG. 4 is a diagram showing the release state of a disconnector when a vehicle normally accelerates in a two-wheel-drive mode.
Figure 5:
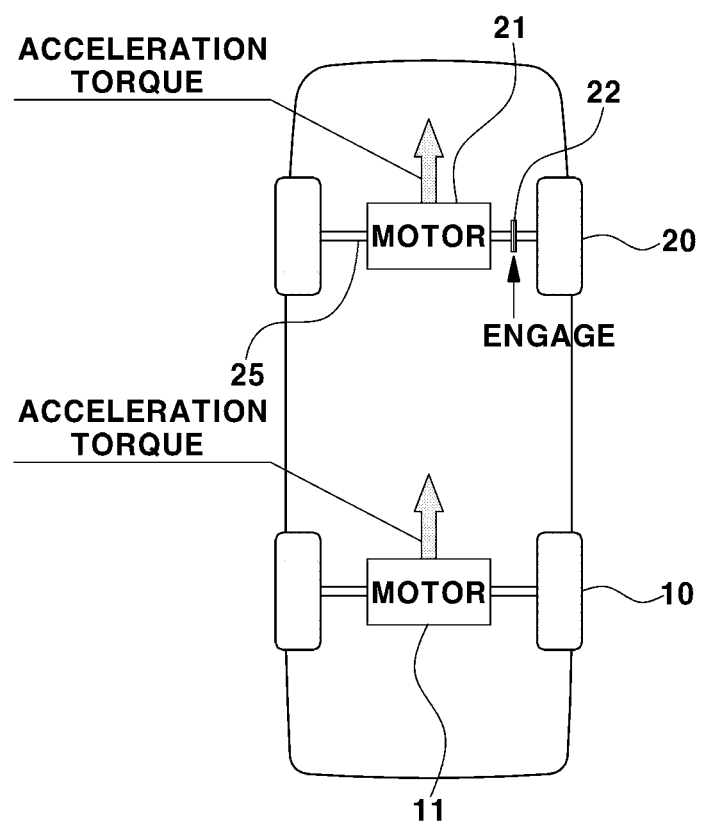
FIG. 5 is a diagram showing an engaged state of a disconnector in a response to failure of a brake system.

FIG. 4 is a diagram showing the release state of a disconnector when a vehicle normally accelerates in a two-wheel-drive mode. FIG. 5 is a diagram showing an engaged state of a disconnector in a response to failure of a brake system.

The four-wheel-drive electric vehicle may accelerate in the two-wheel-drive mode or the four-wheel-drive mode according to the acceleration torque requested by a driver. The requested acceleration torque may be determined based on the manipulation degree of an accelerator pedal.

When excessive spin occurs in the main driving wheels 10 while a vehicle accelerates in the two-wheel-drive mode, the additional braking function system 50 may be operated to thereby stably control the behavior of the vehicle.

For example, when a vehicle enters a low-friction road surface such as a wet road surface or an irregular surface such as a gravel road while accelerating in the two-wheel-drive mode and excessive spin occurs in the main driving wheels 10, a TCS may be operated to reduce the driving force of the main driving wheels 10, and thus the behavior of the vehicle may be stably controlled.

However, when the additional braking function system 50 malfunctions in the two-wheel-drive mode, acceleration may be generated only by the main driving wheels 10, which receive driving force from the first motor 11, and spin occurs only in the main driving wheel 10, and thus a vehicle may spin out.

Accordingly, when detecting failure of the additional braking function system 50 while a vehicle accelerates in the two-wheel-drive mode, the controller 30 may engage the disconnector 22 and may switch the driving mode of the vehicle to four-wheel drive.

As seen from FIG. 4, when a vehicle accelerates in the two-wheel-drive mode, the disconnector 22 may be released to disconnect the auxiliary driving wheels 20 and the second motor 21 from each other, and the vehicle may accelerate using only the driving torque of the first motor 11.

As seen from FIG. 5, when the disconnector 22 is engaged, the auxiliary driving wheel 20 and the second motor 21 may be connected to achieve the state in which the driving torque of the second motor 21 is transferred to the auxiliary driving wheels 20.

When the disconnector 22 is engaged, the controller 30 may redistribute the driving torque, distributed to the first motor 11 prior to detection of failure of the additional braking function system 50, to the first motor 11 and the second motor 21.

For example, when the brake controller 31 detects failure of the additional braking function system 50 and transmits the second brake failure signal to the VCU 32, the VCU 32 may engage the disconnector 22, and simultaneously may distribute the acceleration torque requested by a driver to the first motor 11 and the second motor 21 by manipulating an accelerator pedal.

As driving torque is simultaneously generated in the first motor 11 and the second motor 21, the stability of a vehicle may be increased, and the vehicle may be prevented from spinning out when the additional braking function system 50 malfunctions.

In the instant case, the VCU 32 may determine the driving torque of the first motor 11 and the driving torque of the second motor 21 according to a predetermined distribution ratio. For example, the VCU 32 may distribute first torque to the first motor 11 and may distribute second torque to the second motor 21, in which case the sum of the first torque and the second torque is the acceleration torque requested by a driver, which is distributed to the first motor 11 prior to detection of failure of the additional braking function system 50.

When detecting failure of the additional braking function system 50, the controller 30 may limit the maximum vehicle speed to a first speed. In the instant case, the first speed may be determined as a vehicle speed value for ensuring the stability of the vehicle, and for example, the first speed may be 20 KPH.

When detecting failure of the hydraulic brake system 40 while the vehicle accelerates in the two-wheel-drive mode, the controller 30 may also engage the disconnector 22, and may switch the driving mode of the vehicle to four-wheel drive.

When only failure of the hydraulic brake system 40 occurs, it may be possible to operate the additional braking function system 50, but to ensure the stability of the vehicle, it may be more advantageous to control the driving torque of the main driving wheels 10 and the auxiliary driving wheels 20 than to control only the driving torque of the main driving wheels 10 through the TCS, and thus a driving mode may be switched to four-wheel drive through the disconnector 22.

In other words, when detecting failure of the hydraulic brake system 40 while a vehicle accelerates in a two-wheel-drive mode, the controller 30 may engage the disconnector 22 to switch the driving mode of the vehicle to four-wheel drive and may redistribute the acceleration torque requested by a driver to the first motor 11 and the second motor 21.

Figure 6:
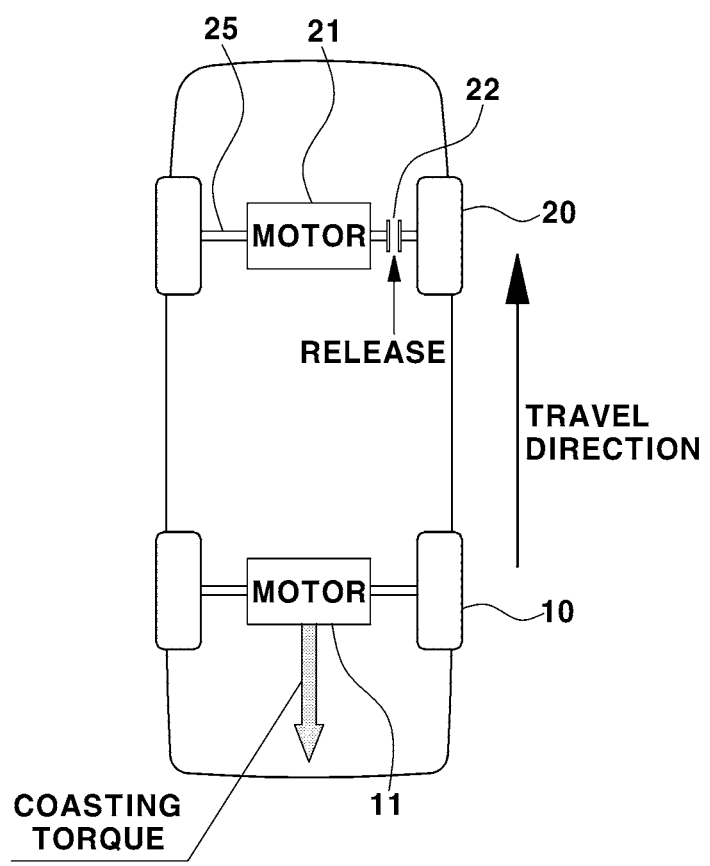
FIG. 6 is a diagram showing the state in which a disconnector is released during normal coasting in a two-wheel-drive mode.
Figure 7:
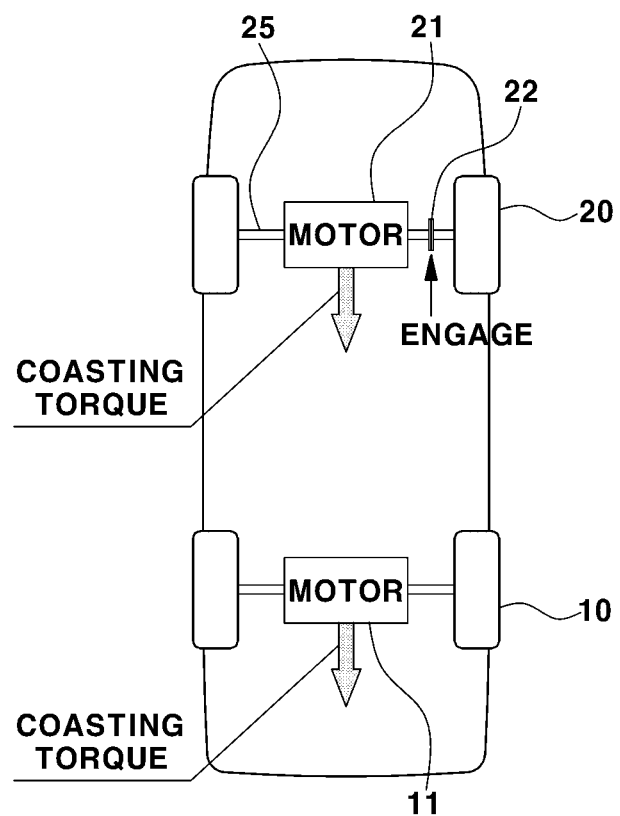
FIG. 7 is a diagram showing the state in which a disconnector is engaged in a response to failure of a hydraulic brake system.
Figure 8:
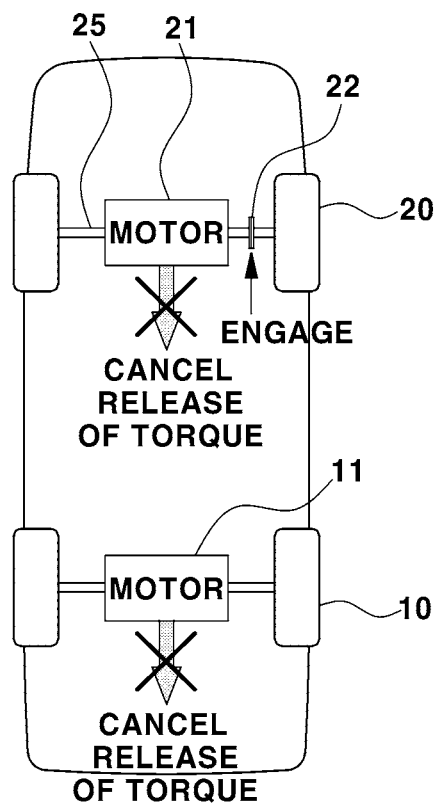
FIG. 8 is a diagram showing the state of cancel release of generation of coasting torque in a response to failure of an additional braking function system.

FIG. 6 is a diagram showing the state in which a disconnector is released during normal coasting in a two-wheel-drive mode. FIG. 7 is a diagram showing the state in which a disconnector is engaged in a response to failure of a hydraulic brake system. FIG. 8 is a diagram showing the state of cancel release of generation of coasting torque in a response to failure of an additional braking function system.

While coasting using inertia without depressing an accelerator pedal, the four-wheel-drive electric vehicle may release the disconnector 22. To achieve spontaneous deceleration through engine drag during coasting of an internal combustion vehicle, the four-wheel-drive electric vehicle may allow the first motor 11 to generate coasting torque for artificial deceleration. In more detail, the coasting torque may be torque in a direction opposite that of the driving torque of the first motor 11.

When coasting torque is generated only in the first motor 11, that is, when coasting torque is not generated in the second motor 21, deceleration may be generated only in the first motor 11 connected to the main driving wheel 10, and thus the behavior of a vehicle may become unstable.

When a vehicle travels on a dangerous road surface in the state in which the behavior of the vehicle is unstable, that is, when the vehicle enters the dangerous road surface while coasting in a two-wheel-drive mode, the controller 30 may perform coasting stability control for preventing wheel slip using an RSC or the like to ensure the stability of the vehicle.

However, when the coasting stability control is not possible due to failure of the additional braking function system 50 such as the RSC, excessive wheel slip occurs depending on the state of a road surface or the like, and thus the vehicle may spinout. When the vehicle travels on a dangerous road surface with a high probability of wheel slip, such as a low-friction road surface, excessive wheel slip may occur.

Accordingly, when detecting failure of the brake systems 40 and 50 during coasting in the two-wheel-drive mode, the controller 30 may switch the disconnector 22 to an engaged mode, and may switch from two-wheel drive to four-wheel drive.

As shown in FIG. 6, in the case of coasting in the two-wheel-drive mode, the disconnector 22 may be released to thereby disconnect the auxiliary driving wheel 20 and the second motor 21 from each other, and coasting torque may occur only in the first motor 11.

As shown in FIG. 7, when the disconnector 22 is engaged, the auxiliary driving wheel 20 and the second motor 21 may be connected to each other, and the state at that time may become the state for facilitating transfer of coasting torque of the second motor 21 to the auxiliary driving wheel 20.

When detecting failure of the hydraulic brake system 40, the controller 30 may redistribute the coasting torque that was originally distributed to the first motor 11 prior to detection of failure of the hydraulic brake system 40 to the first motor 11 and the second motor 21 when the disconnector 22 is engaged.

For example, when the brake controller 31 detects failure of the hydraulic brake system 40 and transmits the first brake failure signal to the VCU 32, the VCU 32 may engage the disconnector 22 and may simultaneously redistribute coasting torque based on a vehicle speed to the first motor 11 and the second motor 21.

This is because it is possible to operate the additional braking function system 50 when only the hydraulic brake system 40 malfunctions, but coasting in four-wheel drive is more advantageous in terms of achievement of the stability of a vehicle than coasting in two-wheel drive.

As coasting torque is distributed to the first motor 11 and the second motor 21 depending on a vehicle speed, coasting torque of the main driving wheel 10 may be reduced, and thus the stability of a vehicle may be relatively increased and the vehicle may be prevent from spinning out even on a dangerous road surface.

In the instant case, the VCU 32 may determine the coasting torque of the first motor 11 and the coasting torque of the second motor 21 according to a predetermined distribution ratio.

When detecting failure of the additional braking function system 50 during coasting in a two-wheel-drive mode, the controller 30 may not distribute coasting torque to the first motor 11 and the second motor 21 as shown in FIG. 8. In other words, when detecting failure of the additional braking function system 50, the controller 30 may perform cancel release on distribution of coasting torque to the first motor 11 and may not distribute coasting torque to the second motor 21.

The reason for this is that the stability of a vehicle needs to be ensured by preventing slippage of the driving wheels 10 and 20 as coasting torque of the motors 11 and 21 is generated. The controller 30 may engage the disconnector 22, and may switch the driving mode to four-wheel drive even when the additional braking function system 50 malfunctions.

As described above, cancel release may be performed on output of coasting torque of the first motor 11 and the second motor 21, that is, coasting torque may not be generated by the first motor 11 or the second motor 21, thus eliminating the possibility of slippage of the driving wheels 10 and 20 when the additional braking function system 50 malfunctions and ensuring the stability of a vehicle During coasting in the state in which the first motor 11 and the second motor 21 do not generate coasting torque, a vehicle may resume acceleration through manipulation of an accelerator pedal. Accordingly, when the vehicle resumes acceleration, if the vehicle accelerates using only the main driving wheel 10, the behavior of the vehicle may become unstable, and accordingly, even if the vehicle coasts in the state in which coasting torque is not generated, the disconnector 22 may remain engaged, as shown in FIG. 8.

Figure 9:
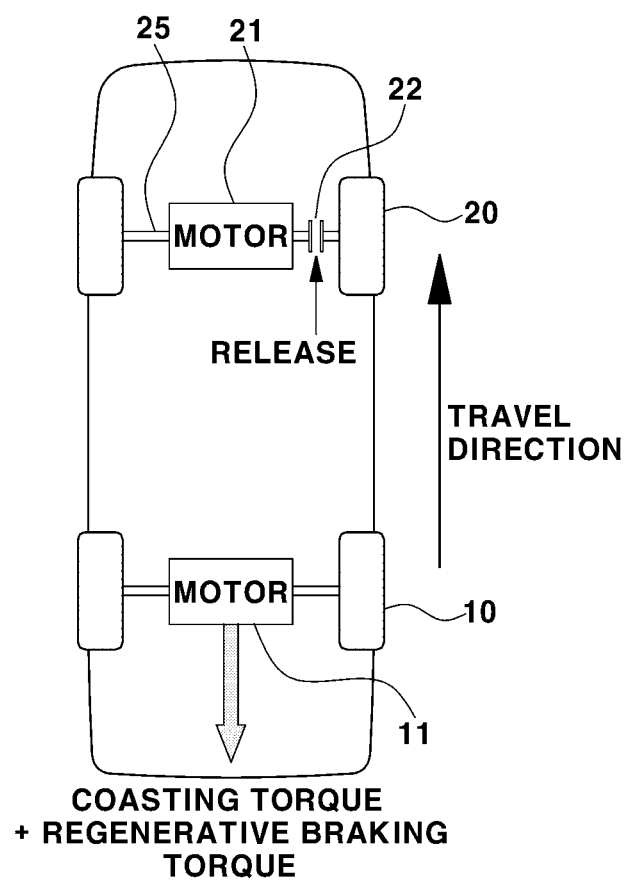
FIG. 9 is a diagram showing the state in which a disconnector is released during normal braking in a two-wheel-drive mode.
Figure 10:
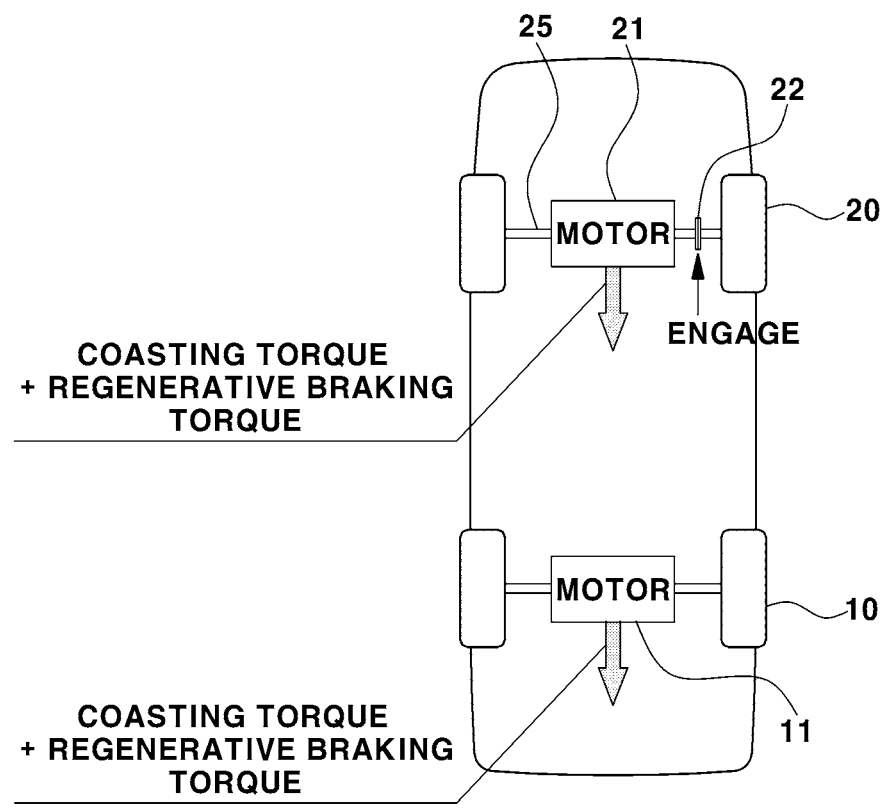
FIG. 10 is a diagram showing the state in which a disconnector is engaged in a response to failure of a hydraulic brake system.
Figure 11:
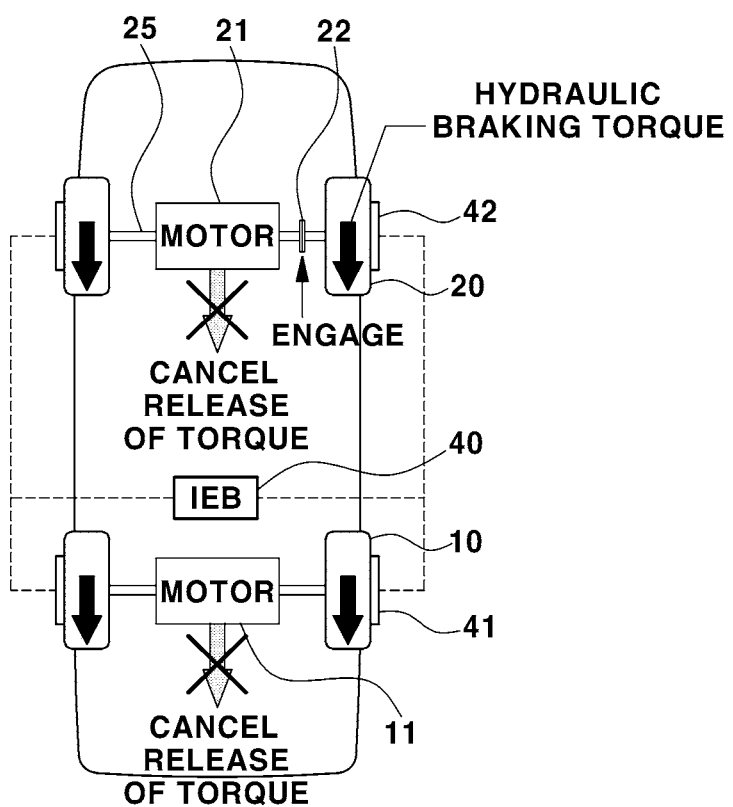
FIG. 11 is a diagram showing the state in which a disconnector is engaged in a response to failure of an additional braking function system.

FIG. 9 is a diagram showing the state in which a disconnector is released during normal braking in a two-wheel-drive mode. FIG. 10 is a diagram showing the state in which a disconnector is engaged in a response to failure of a hydraulic brake system. FIG. 11 is a diagram showing the state in which a disconnector is engaged in a response to failure of an additional braking function system.

The four-wheel-drive electric vehicle may decelerate in a two-wheel-drive mode or a four-wheel-drive mode depending on the braking torque requested by a driver during braking.

As shown in FIG. 9, when the vehicle is requested to decelerate by releasing the disconnector 22 and manipulating a brake pedal while traveling in a two-wheel-drive mode, coasting torque and regenerative braking torque may be generated only in the first motor 11 connected to the main driving wheel 10. In the instant case, braking force is generated only through the first motor 11, and thus the behavior of the vehicle may become unstable compared with the four-wheel-drive mode.

Accordingly, to ensure the stability of the vehicle, the controller 30 may perform coasting stability control for preventing wheel slip using an RSC or the like or, when excessive wheel slip occurs, the controller 30 may perform ABS control by performing cancel release on generation of torque (i.e., coasting torque and regenerative braking torque) of the first motor 11 and supplying hydraulic pressure braking torque to the main driving wheel 10.

The ABS control may be control of braking pressure supplied to a wheel brake through an ABS, in which case hydraulic pressure braking torque is supplied to the main driving wheel 10 due to the braking pressure of the wheel brake. The coasting stability control may be control for intentionally performing deceleration using the coasting torque of a motor. The regenerative braking torque may counter the driving torque supplied to the motor through driving wheels during braking, and may be torque in the same direction as the coasting torque.

However, when it is not possible to perform coasting stability control or ABS control due to failure of the brake systems 40 and 50, if the main driving wheel 10 largely slips due to the state of a road surface, a vehicle may spin out. For example, when a vehicle brakes in a two-wheel-drive mode, excessive wheel slip may occur on a low-friction road surface such as a wet road surface or an irregular surface such as a gravel road.

Thus, when detecting failure of the brake systems 40 and 50 in a two-wheel-drive mode, the controller 30 may switch the disconnector 22 to an engaged mode and may switch from two-wheel drive to four-wheel drive.

As shown in FIG. 9, when a vehicle brakes in the state in which the disconnector 22 is released and the auxiliary driving wheel 20 and the second motor 21 are disconnected from each other, coasting torque and regenerative braking torque may be generated only in the first motor 11.

As shown in FIG. 10, when the disconnector 22 is engaged and the auxiliary driving wheel 20 and the second motor 21 are connected to each other, the state at that time may become the state in which the second motor 21 is configured for generating coasting torque and regenerative braking torque.

Upon detecting failure of the hydraulic brake system 40, the controller 30 may redistribute coasting torque and regenerative braking torque, which are distributed to the first motor 11 prior to detection of the failure, to the first motor 11 and the second motor 21 when the disconnector 22 is engaged.

For example, when the brake controller 31 detects failure of the hydraulic brake system 40 and transmits the first brake failure signal to the VCU 32, the VCU 32 may engage the disconnector 22 and may simultaneously redistribute coasting torque and regenerative braking torque to the first motor 11 and the second motor 21 to thereby transmit a command thereto.

When both the coasting torque and the regenerative braking torque are generated in the first motor 11 and the second motor 21, the vehicle may be prevented from spinning out when the hydraulic brake system 40 malfunctions. The reason for this is that the coasting torque and the regenerative braking torque of the first motor 11 are reduced when torque is also distributed to the second motor 21, improving the stability of the vehicle. Furthermore, in the instant case, the VCU 32 may determine the torque of the first motor 11 and the torque of the second motor 21 according to a predetermined distribution ratio.

When detecting failure of the additional braking function system 50 during braking in a two-wheel-drive mode, the controller 30 may perform cancel release on generation of coasting torque and regenerative braking torque in the first motor 11 and the second motor 21 as shown in FIG. 11.

In other words, when detecting failure of the additional braking function system 50 when the disconnector 22 is released and a brake pedal is manipulated, the controller 30 may perform cancel release on generation of the coasting torque and the regenerative braking torque of the first motor 11 and may not distribute coasting torque or regenerative braking torque even to the second motor 21.

This is because slippage of the driving wheels 10 and 20 occurs due to coasting torque and regenerative braking torque generated in the motors 11 and 21.

Thus, the controller 30 may cancel-release the generation of the coasting torque and the regenerative braking torque of the motors 11 and 21, and thus slippage of the driving wheels 10 and 20 may be prevented and the stability of the vehicle may be ensured. That is, when the additional braking function system 50 malfunctions, the first motor 11 and the second motor 21 may not generate coasting torque or regenerative braking torque, thus eliminating the probability of slippage of the driving wheels 10 and 20 and ensuring the stability of the vehicle.

However, when coasting torque and regenerative braking torque are not generated in the motors 11 and 21, the braking torque requested by a driver through manipulation of a braking pedal may not be satisfied.

Thus, as shown in FIG. 11, the controller 30 may supply braking hydraulic pressure of the hydraulic brake system 40 to wheel brakes 41 and 42, and may apply hydraulic pressure braking torque to the driving wheels 10 and 20. Here, the hydraulic brake system 40 may be an integrated electric brake (IEB) using an electric booster or the like.

For example, when coasting torque and regenerative braking torque are not generated in the motors 11 and 21, the brake controller 31 may operate the hydraulic brake system 40 to thereby generate braking hydraulic pressure. In the instant case, the braking hydraulic pressure of the hydraulic brake system 40 may be determined according to the braking torque requested by a driver.

As shown in FIG. 11, while the vehicle brakes in the state in which the first motor 11 and the second motor 21 do not generate coasting torque or regenerative braking torque, the vehicle may reaccelerate through manipulation of an accelerator pedal. Accordingly, when the vehicle reaccelerates, if the vehicle accelerates using only the main driving wheel 10, the behavior of the vehicle may become unstable, and thus, even if the state at that time is the state in which the motors 11 and 21 do not generate coasting torque or regenerative braking torque, the disconnector 22 may remain engaged to prepare for reacceleration as shown in FIG. 11.

Figure 12:
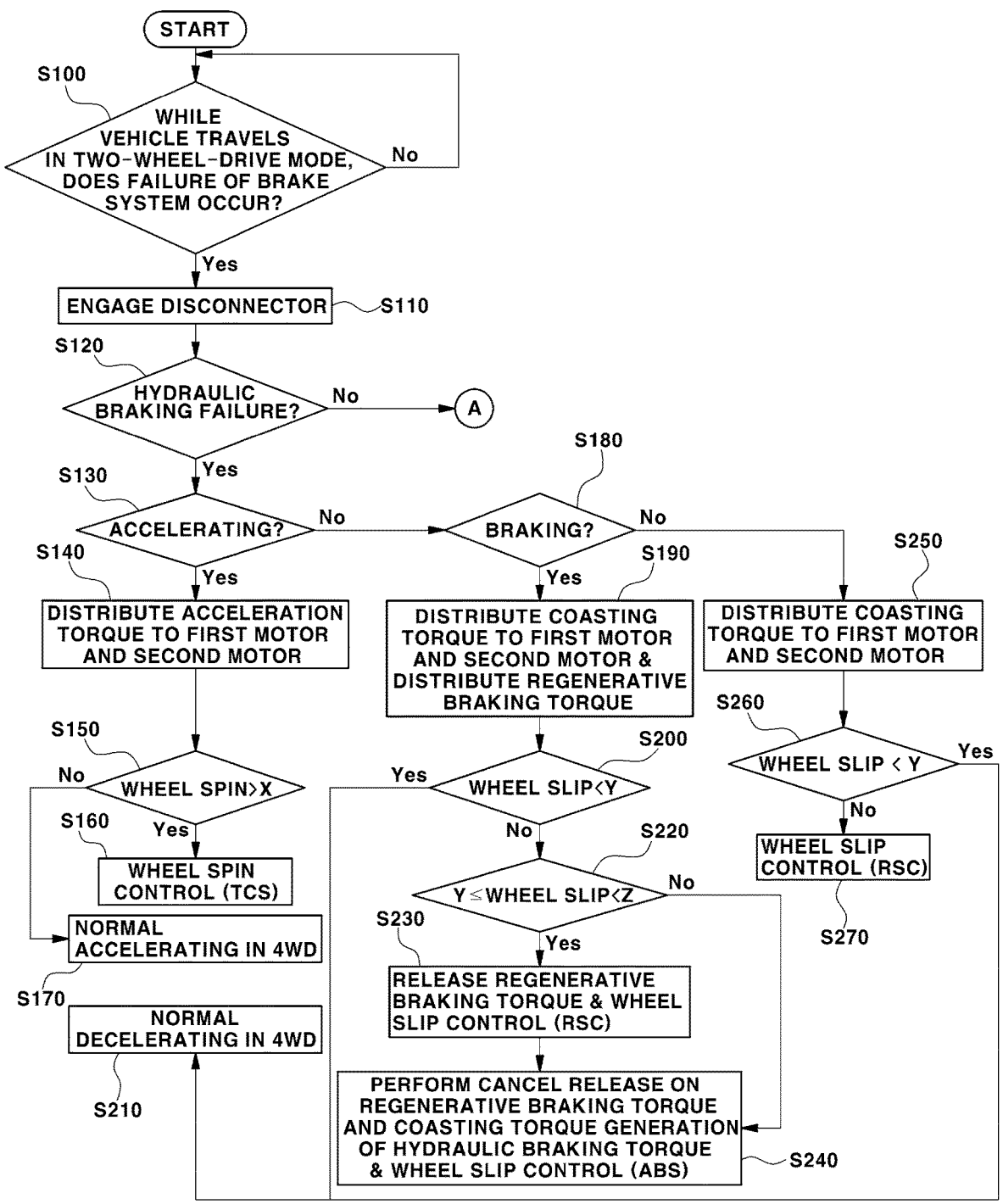
FIG. 12, and FIG. 13 are flowcharts showing an example of a method of responding to failure of a brake system through a control device configured for responding to failure according to various exemplary embodiments of the present invention.
Figure 13:
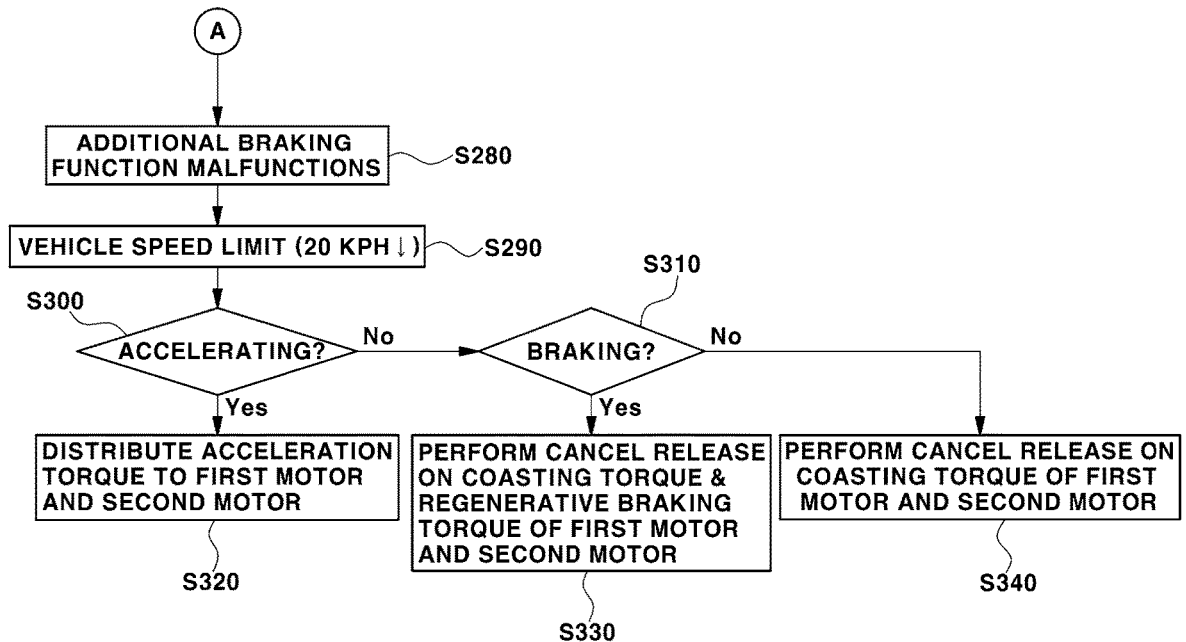

FIG. 12, and FIG. 13 are flowcharts showing an example of a method of responding to failure of a brake system through a control device configured for responding to failure according to various exemplary embodiments of the present invention. A of FIG. 12 is connected to A of FIG. 13. It is noted that the method of responding to failure of a brake system according to various exemplary embodiments of the present invention is not limited to the order shown in FIG. 12, and FIG. 13.

As shown in FIG. 12, the controller 30 may monitor whether the brake systems 40 and 50 malfunction while traveling in the two-wheel-drive mode (S100). When detecting failure of the brake systems 40 and 50, the controller 30 may engage the disconnector 22 (S110).

For example, the brake controller 31 may monitor whether the brake systems 40 and 50 malfunction, and when detecting failure of the brake systems 40 and 50, the brake controller 31 may transmit a brake failure signal of the brake systems 40 and 50 to the VCU 32. When receiving the brake failure signal, the VCU 32 may engage the disconnector 22 and may connect the auxiliary driving wheel 20 and the second motor 21.

The controller 30 may determine whether failure of the brake systems 40 and 50 is the same as failure of the hydraulic brake system 40 (S120). For example, the VCU 32 may determine whether the brake failure signal transmitted from the brake controller 31 is the first brake failure signal.

When detecting failure of the hydraulic brake system 40, the controller 30 may determine the driving mode of the vehicle to be any one of a braking mode and a coasting mode. To the present end, when detecting failure of the hydraulic brake system 40, the controller 30 may first determine whether a vehicle is accelerating (S130). For example, when receiving the first brake failure signal, the VCU 32 may first determine whether the vehicle is accelerating.

When the vehicle is accelerating, the controller 30 may distribute driving torque to the first motor 11 and the second motor 21 when the disconnector 22 is engaged (S140). In detail, prior to detection of failure of the hydraulic brake system 40, the controller 30 may redistribute the acceleration torque requested by a driver, which is redistributed to the first motor 11 prior to detection of failure of the hydraulic brake system 40, to the first motor 11 and the second motor 21 when the disconnector 22 is engaged.

Accordingly, the controller 30 may compare a spin ratio of the driving wheels 10 and 20 with a first spin ratio X (S150). The first spin ratio X may be determined as a spin ratio at which a vehicle may spinout.

When each of a spin ratio of the main driving wheels 10 and a spin ratio of the auxiliary driving wheels 20 is greater than the first spin ratio X, the controller 30 may operate the TCS for spin control of the driving wheels 10 and 20 and may cause reduction of the spin ratio of the driving wheels 10 and 20 (S160). In detail, when the spin ratio of the driving wheels 10 and 20 is greater than the first spin ratio X, the controller 30 may control the driving torque of the motors 11 and 21 through the TCS to prevent wheel spin and to ensure the acceleration characteristics of the vehicle. In the instant case, the TCS may reduce the driving torque of a motor to thereby prevent spinning of the driving wheel while a vehicle accelerates.

When the spin ratio of the main driving wheel 10 and the spin ratio of the auxiliary driving wheel 20 are each equal to or less than the first spin ratio X, the controller 30 may determine that the vehicle is accelerating normally in the four-wheel-drive mode (S170).

When determining that the vehicle is not accelerating in operation S130, the controller 30 may determine whether the vehicle is braking (S180). In the instant case, whether the vehicle is braking may be determined based on whether a brake pedal is manipulated.

When determining that the vehicle is braking, the controller 30 may distribute coasting torque and regenerative braking torque to the first motor 11 and the second motor 21 based on the real-time vehicle speed and the extent of depression of a brake pedal (i.e., the braking torque requested by driver) (S190).

Accordingly, the controller 30 may compare the slip ratio of the driving wheels 10 and 20 with a first slip ratio Y (S200). When the slip ratio of the main driving wheel 10 and the slip ratio of the auxiliary driving wheel 20 are smaller than the first slip ratio Y, the controller 30 may determine that the vehicle is decelerating normally in the four-wheel drive mode (S210).

When the slip ratio of the main driving wheels 10 and the slip ratio of the auxiliary driving wheels 20 are equal to or greater than the first slip ratio Y, the controller 30 may also compare the slip ratio of the driving wheels 10 and 20 with a second slip ratio Z (S220).

In the instant case, the first slip ratio Y may be determined as a value in which the vehicle may spinout, and the second slip ratio Z may be determined as a value which is greater than the first slip ratio Y by a predetermined value. The second slip ratio Z may be determined as a slip ratio value in which it is determined that the slip ratio of the driving wheels 10 and 20 is excessive and the driving wheels 10 and 20 are locked. For example, the second slip ratio Z may be "the first slip ratio Y+α".

As the comparison result of operation S220, when the slip ratio of the main driving wheels 10 and the slip ratio of the auxiliary driving wheel 20 are smaller than the second slip ratio Z, that is, when both the slip ratios of the driving wheels 10 and 20 are equal to or greater than the first slip ratio Y and smaller than the second slip ratio Z, the controller 30 may perform cancel release on generation of regenerative braking torque of the motors 11 and 21 and may operate the RSC for slip control of the driving wheels 10 and 20 (S230). In the instant case, the RSC may reduce the slip ratio of the driving wheels 10 and 20 through control of lowering the generation of coasting torque of the motors 11 and 21.

When the slip ratio of the driving wheels 10 and 20 is equal to or greater than the second slip ratio Z, the controller 30 may determine that the current situation is a dangerous situation in which the driving wheels 10 and 20 may be locked.

Thus, the controller 30 may perform cancel release on generation of coasting torque and regenerative braking torque of the motors 11 and 21 and may supply braking hydraulic pressure to each of the wheel brakes 41 and 42 of the main driving wheel 10 and the auxiliary driving wheel 20 through the hydraulic brake system 40, and thus may provide the hydraulic pressure braking torque to the driving wheels 10 and 20 (S240). In the instant case, the braking hydraulic pressure of the wheel brakes 41 and 42 may be replaced with the coasting torque and the regenerative braking torque of the motors 11 and 21, and thus, the braking hydraulic pressure may be determined based on the coasting torque and the regenerative braking torque.

The controller 30 may operate the ABS for wheel slip control based on the fact that the current situation is a situation in which the hydraulic brake system 40 malfunctions (S240). While the ABS is operated, the braking pressure of the wheel brakes 41 and 42, which is provided on the driving wheels 10 and 20, respectively, may be controlled to reduce the individual slip ratios of the driving wheels 10 and 20, preventing the driving wheels 10 and 20 from being locked.

When determining that the vehicle is not braking in operation S180, the controller 30 may determine that the vehicle is coasting.

When failure of the hydraulic brake system 40 is detected, if the vehicle is coasting, the controller 30 may distribute coasting torque to the first motor 11 and the second motor 21 (S250). In other words, when the first brake failure signal is detected, if the vehicle is coasting, the controller 30 may redistribute coasting torque, which is distributed to the first motor 11 prior to detection of the first brake failure signal, to the first motor 11 and the second motor 21.

The controller 30 may compare the slip ratio of the driving wheels 10 and 20 with the first slip ratio Y (S260). When the slip ratio of the main driving wheel 10 and the slip ratio of the auxiliary driving wheels 20 are smaller than the first slip ratio Y, the controller 30 may determine that the vehicle is decelerating normally in the four-wheel drive mode (S210).

When the slip ratio of the main driving wheels 10 and the auxiliary driving wheels 20 is equal to or greater than the first slip ratio Y, the controller 30 may operate the RSC for slip control of the driving wheels 10 and 20 (S270). In the instant case, the RSC may control the coasting torque of the motors 11 and 21 and may reduce the slip ratio of the driving wheels 10 and 20. For example, the RSC may reduce the coasting torque of the motors 11 and 21 to thereby reduce the slip ratio of the driving wheels 10 and 20.

As shown in FIG. 13, when determining that the hydraulic brake system 40 does not malfunction in operation S100, the controller 30 may determine that the additional braking function system 50 malfunctions (S280).

When detecting failure of the additional braking function system 50, the controller 30 may first limit a vehicle speed to the first speed or less (S290) and may then determine the driving mode of the vehicle.

The controller 30 may first determine whether the vehicle is accelerating (S300) and may determine that the vehicle is braking when the vehicle is not accelerating (S310).

When the vehicle is accelerating, the controller 30 may distribute acceleration torque to the first motor 11 and the second motor 21 (S320). In detail, the controller 30 may redistribute the acceleration torque requested by a driver, which is distributed to the first motor 11 prior to detection of failure of the additional braking function system 50, to the first motor 11 and the second motor 21 when the disconnector 22 is engaged. This is because the stability of the vehicle needs to be ensured by preventing the driving wheels 10 and 20 from spinning.

While the vehicle is braking, the controller 30 may perform cancel release on generation of coasting torque and regenerative braking torque of motors 11 and 21 (S330). This is because the stability of a vehicle needs to be ensured by preventing slippage of the driving wheels 10 and 20 due to generation of the coasting torque and the regenerative braking torque of the motors 11 and 21.

When the vehicle is determined not to be braking, as the result of the determination in operation S310, that is, when the vehicle is coasting, cancel release may be performed on generation of the coasting torque of the motors 11 and 21 (S340). This is because slippage of the driving wheels 10 and 20 due to generation of the coasting torque of the motors 11 and 21 needs to be prevented.

Figure 14:
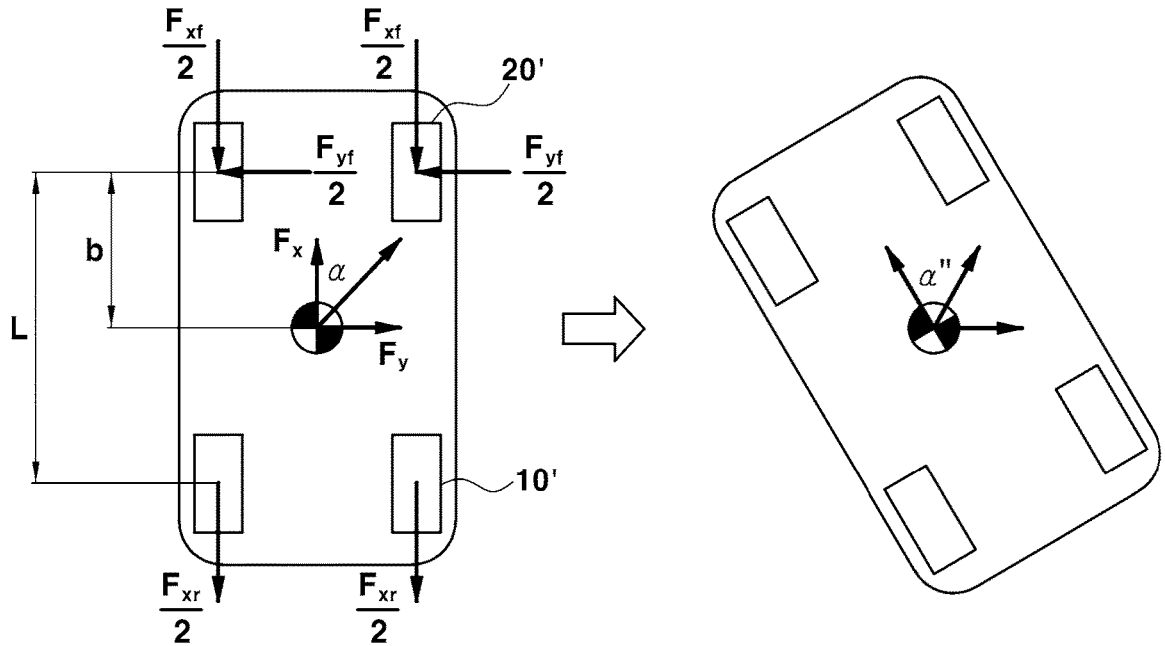
FIG. 14 is a reference diagram for explaining the behavior of a vehicle when wheel-lock occurs due to excessive braking force of a rear wheel.

FIG. 14 is a reference diagram for explaining the behavior of a vehicle when wheel-lock occurs due to excessive braking force of a rear wheel.

Referring to FIG. 14, when braking force of a rear wheel 10' is excessive, braking force $F_{xf}$ and lateral force $F_{yf}$ may be applied to a front wheel 20', and in contrast, wheel-lock may occur in the rear wheel 10', but lateral force may not be applied, and only braking force $F_{xr}$ may be applied.

In the instant case, inertia force $F_x$ and lateral force $F_y$ as reaction force of braking force and lateral force may be applied in a longitudinal direction and a lateral direction to the center of gravity of a vehicle, and both force and moment of the resultant force which is applied to the vehicle in a longitudinal direction are balanced, but lateral-direction force $F_y$ may form a moment '$F_y \times b$' with respect to the center of gravity of a vehicle. When the vehicle turns in a lateral direction due to the moment, the angle α between the inertia force applied to the center of gravity and the resultant force is increased, and thus as yaw is increasingly generated, the braking stability of the vehicle may be degraded.

According to the aforementioned solutions, the present invention may ensure the stability of a vehicle while the vehicle is coasting, in addition to when the vehicle is accelerating and braking, when a brake system malfunctions in a two-wheel-drive mode.

Furthermore, the term "controller", "control unit" or "control device" refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The controller according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors.

The controller or the control unit may be at least one microprocessor operated by a predetermined program which may include a series of commands for carrying out the method included in the aforementioned various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

In various exemplary embodiments of the present invention, each operation described above may be performed by a controller, and the controller may be configured by a plurality of controllers, or an integrated single controller.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A control device for responding to failure of a brake system of a vehicle, the control device comprising:
   a first motor configured to selectively provide a driving torque to a main driving wheel of the vehicle;
   a second motor configured to selectively provide a driving torque to an auxiliary driving wheel of the vehicle;
   a disconnector provided at a driveshaft of the auxiliary driving wheel and configured to selectively switch a power transfer between the auxiliary driving wheel and the second motor; and
   a controller connected to the disconnector and configured to control the disconnector to connect the auxiliary driving wheel and the second motor upon detecting the failure of the brake system in the vehicle when the vehicle travels in a state in which the auxiliary driving wheel and the second motor are disconnected by the disconnector and the driving torque of the first motor is provided to the main driving wheel,
   wherein when the auxiliary driving wheel and the second motor are disconnected by the disconnector, the driving torque of the second motor is not transferred to the auxiliary driving wheel,
   wherein when the auxiliary driving wheel and the second motor are connected by the disconnector, the driving torque of the second motor is transferred to the auxiliary driving wheel,
   wherein the failure of the brake system includes a first braking failure, and
   wherein, upon detecting the first braking failure of the brake system while the vehicle is accelerating, the controller is configured to redistribute an acceleration torque requested by a driver to the first motor and the second motor when the disconnector is engaged,
   wherein the first braking failure is a failure in which a target hydraulic pressure cannot be provided through manipulation of a brake pedal of the vehicle.

2. The control device of claim 1, wherein, when a spin ratio of the main driving wheel and the auxiliary driving wheel is greater than a predetermined first spin ratio, the controller is configured to reduce the driving torques of the first motor and the second motor and to reduce the spin ratio of the main driving wheel and the auxiliary driving wheel.

3. The control device of claim 1,
   wherein the failure of the brake system includes a second braking failure, and
   wherein, upon detecting the second braking failure of the brake system when the vehicle is accelerating, the controller is configured to limit a maximum vehicle speed to a predetermined first speed, and to redistribute the acceleration torque requested by the driver to the first motor and the second motor when the disconnector is engaged.

4. The control device of claim 3, wherein the second braking failure is a failure in which an additional braking function system cannot be operated for preventing spinning and slippage of at least one of the main driving wheel and the auxiliary driving wheel.

5. The control device of claim 1, wherein, upon detecting the first braking failure of the brake system while the vehicle is coasting, the controller is configured to redistribute a coasting torque, depending on a vehicle speed, to the first motor and the second motor when the disconnector is engaged.

6. The control device of claim 5, wherein, when a slip ratio of the main driving wheel and the auxiliary driving wheel is equal to or greater than a predetermined first slip ratio, the controller is configured to control the coasting torque of the first motor and the second motor and to reduce the slip ratio of the main driving wheel and the auxiliary driving wheel.

7. The control device of claim 4, wherein, when detecting the second braking failure of the brake system when the vehicle is coasting, the controller is configured to limit a maximum vehicle speed to a predetermined first speed and to perform cancel release on generation of a coasting torque of the first motor and the second motor when the disconnector is engaged.

8. The control device of claim 1, wherein, when detecting the first braking failure of the brake system while the vehicle is braking, the controller is configured to redistribute a coasting torque depending on a vehicle speed and a regenerative braking torque through manipulation of the brake pedal to the first motor and the second motor when the disconnector is engaged.

9. The control device of claim 8, wherein, when the slip ratio of the main driving wheel and the slip ratio of the auxiliary driving wheel are equal to or greater than a predetermined first slip ratio and is less than a second slip ratio, the controller is configured to perform cancel release on generation of the regenerative braking torque of the first motor and the second motor and is configured to control the coasting torque of the first motor and the second motor to reduce the slip ratio of the main driving wheel and the auxiliary driving wheel.

10. The control device of claim 9, wherein, when the slip ratio of the main driving wheel and the slip ratio of the auxiliary driving wheel are equal to or greater than the second slip ratio, the controller is configured to perform cancel release on generation of the coasting torque and the regenerative braking torque of the first motor and the second motor to supply braking hydraulic pressure to a wheel brake of each of the main driving wheel and the auxiliary driving wheel.

11. The control device of claim 10, wherein the braking hydraulic pressure of the wheel brake is determined according to the coasting torque and the regenerative braking torque.

12. The control device of claim 10, wherein the controller is configured to control the braking pressure of the wheel brake to reduce the slip ratio of the main driving wheel and the auxiliary driving wheel.

13. The control device of claim 4, wherein, when detecting the second braking failure of the brake system while the vehicle is braking, the controller is configured to perform cancel release on generation of a coasting torque and a regenerative braking torque of the first motor and the second motor.

14. The control device of claim 1, wherein, when the disconnector is engaged, the auxiliary driving wheel and the second motor are connected to transfer a power from the second motor to the auxiliary driving wheel.

15. A control method for responding to failure of a brake system of a vehicle, the control method comprising:
  engaging, by a signal of a controller, a disconnector to connect an auxiliary driving wheel and a second motor upon detecting the failure of the brake system in the vehicle when the vehicle travels in a state in which the auxiliary driving wheel and the second motor are disconnected by the disconnector and a driving torque of a first motor is provided to a main driving wheel,
  wherein when the auxiliary driving wheel and the second motor are disconnected by the disconnector, a driving torque of the second motor is not transferred to the auxiliary driving wheel, and
  when the auxiliary driving wheel and the second motor are connected by the disconnector, the driving torque of the second motor is transferred to the auxiliary driving wheel, and
  wherein the vehicle includes:
    the main driving wheel, the auxiliary driving wheel, the controller, and the disconnector;
    the first motor configured to selectively provide the driving torque to the main driving wheel of the vehicle;
    the second motor configured to selectively provide the driving torque to the auxiliary driving wheel of the vehicle; and
    the disconnector provided at a driveshaft of the auxiliary driving wheel and configured to selectively switch a power transfer between the auxiliary driving wheel and the second motor according to the signal of the controller,
  wherein the failure of the brake system includes a first braking failure,
  wherein the control method further includes:
    upon detecting the first braking failure of the brake system while the vehicle is accelerating, redistributing, by the controller, an acceleration torque requested by a driver to the first motor and the second motor when the disconnector is engaged, and
  wherein the first braking failure is a failure in which a target hydraulic pressure cannot be provided through manipulation of a brake pedal of the vehicle.

16. The control method of claim 15,
  wherein the failure of the brake system includes a second braking failure,
  wherein the control method further includes:
    upon detecting the second braking failure of the brake system when the vehicle is accelerating, the controller is configured to limit a maximum vehicle speed to a predetermined first speed, and to redistribute the acceleration torque requested by the driver to the first motor and the second motor when the disconnector is engaged, and
  wherein the second braking failure is a failure in which an additional braking function system cannot be operated for preventing spinning and slippage of at least one of the main driving wheel and the auxiliary driving wheel.

* * * * *